(12) United States Patent
North et al.

(10) Patent No.: US 12,184,069 B2
(45) Date of Patent: *Dec. 31, 2024

(54) MANAGING ELECTRIC VEHICLE LOADS ON AN ELECTRIC GRID

(71) Applicant: Recargo, Inc., El Segundo, CA (US)

(72) Inventors: Forrest North, El Segundo, CA (US); Lucas Manfield, El Segundo, CA (US)

(73) Assignee: Recargo, Inc., El Segundo, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 17/678,785

(22) Filed: Feb. 23, 2022

(65) Prior Publication Data

US 2022/0181875 A1  Jun. 9, 2022

Related U.S. Application Data

(63) Continuation of application No. 17/013,383, filed on Sep. 4, 2020, now Pat. No. 11,264,800, which is a (Continued)

(51) Int. Cl.
*H02J 7/00* (2006.01)
*B60L 53/30* (2019.01)
(Continued)

(52) U.S. Cl.
CPC .............. *H02J 3/003* (2020.01); *B60L 53/30* (2019.02); *B60L 53/305* (2019.02); *B60L 53/63* (2019.02); *B60L 53/67* (2019.02); *B60L 53/68* (2019.02); *H02J 3/14* (2013.01); *H02J 3/322* (2020.01); *H02J 7/0013* (2013.01); *H02J 7/0048* (2020.01); *H02J 7/007* (2013.01); *H02J 2310/48* (2020.01); *Y02E 60/00* (2013.01); *Y02T 10/70* (2013.01); *Y02T 10/7072* (2013.01); (Continued)

(58) Field of Classification Search
CPC .... H02J 3/003; H02J 3/322; H02J 3/14; H02J 7/0048; H02J 7/0013; H02J 7/007; B60L 53/67; B60L 53/68; B60L 53/305; B60L 53/30; B60L 53/63
USPC ........................................................ 320/109
See application file for complete search history.

(56) References Cited

U.S. PATENT DOCUMENTS 8,198,959 B2  6/2012  Takahara
9,434,271 B2  9/2016  North et al.
(Continued)

*Primary Examiner* — Alexis B Pacheco
(74) *Attorney, Agent, or Firm* — AMPACC Law Group, PLLC

(57) ABSTRACT

Systems and methods for performing actions in response to charging events, such as charging events associated with a specific electric vehicle and/or a specific charging station, are described. In some embodiments, the systems and methods may receive a request from an electric vehicle to identify a charging station from which to charge a battery of the electric vehicle, provide information associated with the electric vehicle to one or more charging stations proximate to the electric vehicle, receive from the one or more charging stations information identifying parameters associated with potential charging events provided by the one or more charging stations, and provide the information identifying the parameters associated with potential charging events provided by the one or more charging stations to the electric vehicle.

19 Claims, 3 Drawing Sheets

Related U.S. Application Data continuation of application No. 15/155,813, filed on May 16, 2016, now Pat. No. 10,766,370.

(60) Provisional application No. 62/162,334, filed on May 15, 2015.

(51) Int. Cl.
  *B60L 53/63* (2019.01)
  *B60L 53/67* (2019.01)
  *B60L 53/68* (2019.01)
  *H02J 3/00* (2006.01)
  *H02J 3/14* (2006.01)
  *H02J 3/32* (2006.01)
  *H02J 7/14* (2006.01)

(52) U.S. Cl.
  CPC ............... *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01); *Y04S 30/14* (2013.01)

(56) References Cited

U.S. PATENT DOCUMENTS

| | | | |
|---|---|---|---|
| 11,716,022 B2* | 8/2023 | Tarroboiro | H02M 3/158 323/271 |
| 2009/0027931 A1* | 1/2009 | Usui | H02J 9/061 363/84 |
| 2009/0174365 A1 | 7/2009 | Lowenthal et al. | |
| 2010/0141204 A1 | 6/2010 | Tyler et al. | |
| 2010/0141205 A1 | 6/2010 | Tyler et al. | |
| 2011/0001356 A1 | 1/2011 | Pollack | |
| 2016/0370806 A1 | 12/2016 | North et al. | |
| 2017/0093168 A1* | 3/2017 | Von Novak, III | H02J 50/12 |
| 2017/0338686 A1* | 11/2017 | Pan | H02J 50/80 |
| 2018/0138735 A1* | 5/2018 | Maalouf | H02J 50/12 |
| 2018/0309315 A1* | 10/2018 | Der | H02J 7/00714 |

\* cited by examiner

MANAGING ELECTRIC VEHICLE LOADS ON AN ELECTRIC GRID

CROSS-REFERENCES TO RELATED APPLICATIONS

The present application is a continuation of U.S. application Ser. No. 17/013,383 filed Sep. 4, 2020, now U.S. Pat. No. 11,264,800, issued Mar. 1, 2022, which is a continuation of U.S. application Ser. No. 15/155,813 filed on May 16, 2016, now U.S. Pat. No. 10,766,370, issued Sep. 8, 2020, which claims the benefit to U.S. Provisional Patent Application No. 62/162,334, entitled MANAGING ELECTRIC VEHICLE LOADS ON AN ELECTRIC GRID, filed on May 15, 2015, which are hereby incorporated by reference in their entirety into this application

BACKGROUND OF THE INVENTION

Although the adoption of electric vehicles is increasing, there are still many people that find them confusing or inaccessible, or are otherwise not interested in using electric vehicles for their transportation needs. Therefore, technology is being developed to remove such barriers associated with the adoption of electric vehicles.

DETAILED DESCRIPTION OF THE INVENTION

Overview

Figure 1:
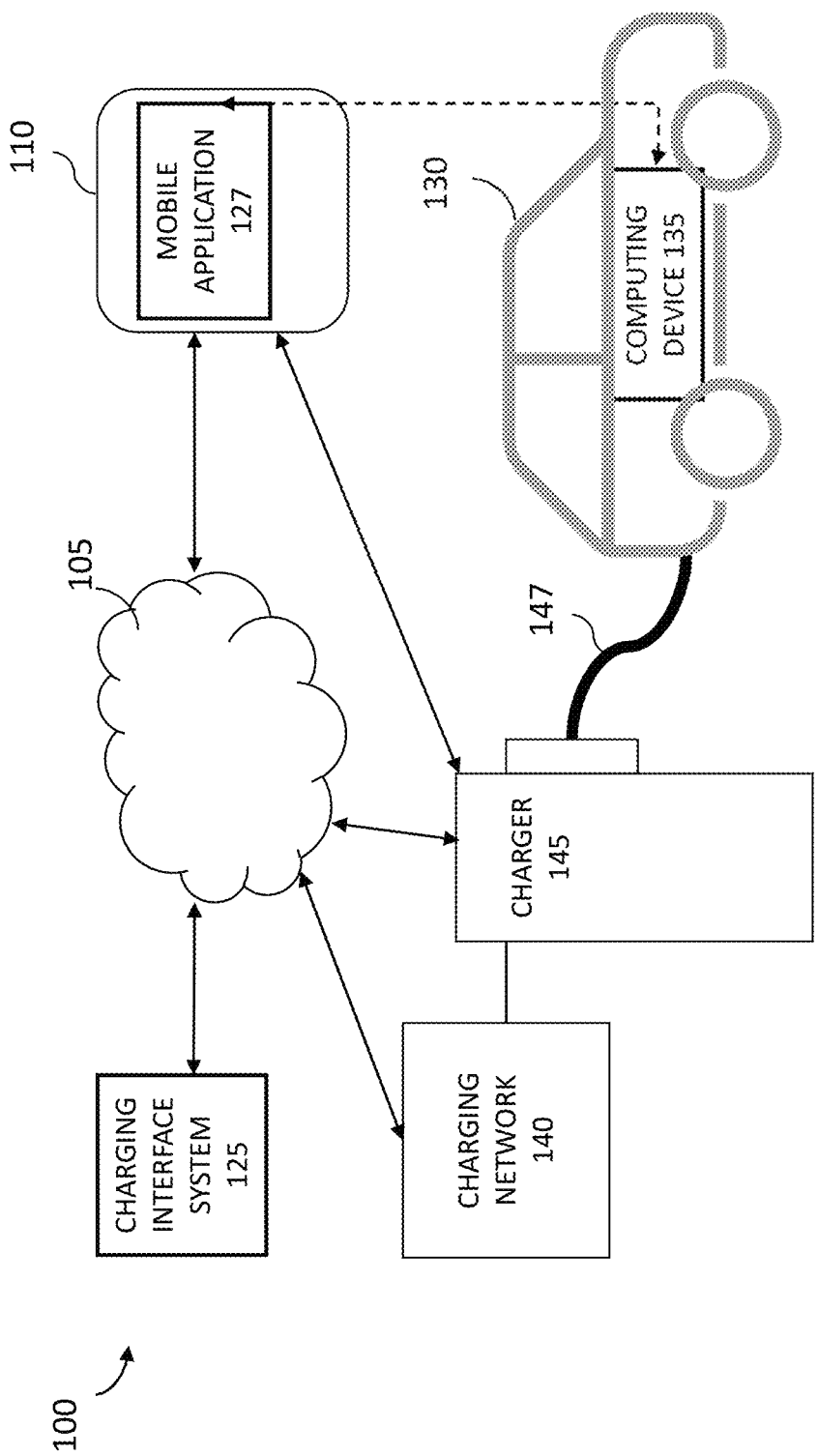
FIG. 1 is a block diagram illustrating components of a suitable computing environment.

Systems and methods for generating grid alerts for an electric grid, and performing actions in response to the grid alerts, such as shaping, shifting, or otherwise modifying a load condition (e.g., high demand or high supply condition) applied to the grid, are described.

In some embodiments, the systems and methods access information identifying states of charging events for one or more electric vehicles at one or more charging stations, the one or more charging stations coupled to an electric grid and providing charge to the one or more electric vehicles, determine that the information identifying the states of the charging events for the one or more electric vehicles at the one or more charging stations coupled to the electric grid indicates a condition of the electric grid that is above a predetermined threshold condition of the electric grid, and perform an action in response to determining the condition of the electric grid is above the predetermined threshold condition of the electric grid.

For example, the systems and methods manage a load or supply applied to an electric grid by receiving a grid alert from an electric grid that indicates the electric grid is in a peak demand condition or an oversupply condition, and directly control charging operations of a fleet of electric vehicles connected to the electric grid to manage the peak demand condition or oversupply condition of the electric grid (e.g., to shape or shift the applied load by controlling operations associated with the electric vehicles, such as the energy storage capacity of the electric vehicles).

Thus, in some embodiments, the systems and methods described herein enable a fleet of vehicles to represent a dynamic load capacity to an electric grid, where charging operations for one, some, or all of the vehicles are modified (e.g., paused, started), or charge is supplied back to the grid), in response to alert conditions (e.g., high demand, high supply, low or high voltage) at the electric grid, among other benefits.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Systems and methods for managing electric loads placed on an electric grid based on various concurrent charging events between charging stations and electric vehicles are described. For example, a grid alert system that communicates with one or more electric vehicles and/or charging stations (e.g., a fleet of electric vehicles) may identify current conditions applied to the grid and/or conditions predicted to be applied to the grid, and generate or create grid alerts in response to various load or supply conditions on the electric grid.

FIG. 1 illustrates components of a suitable computing environment 100 in which the systems and methods for performing actions associated with generating and responding to grid alerts may be supported and/or implemented. The computing environment 100 includes a mobile device 110, such as a smart phone or tablet computer that supports and provides applications (e.g., "apps") to a user of the mobile device 110. For example, the mobile device 110 may include a mobile application 127 provided by a charging interface system 125. The mobile application 127 may communicate with the charging interface system 125, one or more charging networks that provide one or more charging stations 145a-c, and/or one or more electric vehicles 130a-c, over a network 105, such as the internet or other wireless or telecommunication networks. During charging events (e.g., events when the electric vehicles are charging), the electric vehicles (EVs) 130a-c (e.g., a vehicle, plugin hybrid, range extended hybrid, electric traction or battery or plugin vehicle) may be connected to the charging stations 145a-c via charging cables 147a-c, which provide charge to a battery pack of the EV 130.

The mobile device 110 may be a tablet computer, mobile device, smart-phone, net-book, mobile GPS navigation device, or any other device that supports, presents, and/or displays apps via a user interface, such as a touch-screen, of the device. The mobile device 110 includes various hardware and/or software components in order to provide such functionality. For example, the mobile device 110 includes various human interface components, device components, and memory, and so on.

The mobile device 110 may include a touch-screen or other input component that provides input to a processor. The touch-screen may include or communicate with a hardware controller, such as a touch-screen driver, that interprets raw signals received from the touch-screen and transmits information associated with a contact event (e.g., a pressing of an app via the touch-screen), to the processor. The touch-screen may be part of a display, such as a touch-screen display, a flat panel display, an electronic ink display, a head-mounted display, a liquid crystal display, a light-emitting diode display, a plasma panel display, an electroluminescent display, a vacuum fluorescent display, a digital projector, a laser projector, a heads-up display, and so on. The mobile device 110 may include other interface components, such as a speaker that provides appropriate auditory signals to assist a user in navigating a touch-screen, and so on.

The mobile device 110 may include various device components, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The mobile device 110 may include a processor that communicates with data or applications stored in memory of the device 110, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory may include various program components or modules, such as an operating system, and various applications, such as applications downloaded to the device 110. For example, the memory may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

The memory may store one or more applications associated with an electric vehicle, such as the mobile application 127, which facilitates communications between the mobile device 110 and the electric vehicles 130a-c, the charging stations 145a-c, and/or a server supporting the charging interface system 125.

In some embodiments, one or more communication devices may be provided and/or integrated with the charging stations 145a-c and/or the electric vehicles 130a-c. These communication devices may access and receive various types of data from the charging stations 145a-c and/or the electric vehicles 130a-c (e.g., via various assigned APIs or network addresses), such as data or information associated with a state of charge of the batteries of the electric vehicles, a state of a charging event (e.g., a state where an electric vehicle is charging, a state where the electric vehicle is not charging, and so on) between the charging stations 145a-c and/or the electric vehicles 130a-c, and so on.

The mobile application 127 may communicate over the network 105 with the electric vehicles 130a-c (or associated communication devices), the charging stations 145a-c ((or associated communication devices), and/or the charging interface system 125. The network 105 may be a Local Area Network (LAN), a Wide Area Network (WAN), the Internet, various different telecommunication networks (4G, LTE, and so on), or other networks capable of facilitating various communications between computing devices.

In some example embodiments, the mobile application 127 may communicate directly with various components of the computing environment 100. The mobile device 110 may include various communication components (e.g., Bluetooth) that facilitate short range, near field, and/or other direct or personal area network communications between devices. For example, the mobile application 127 may utilize Bluetooth communication to exchange data with the charging stations 145a-c when other networks are unavailable or inaccessible (e.g., when EV 130a is at the charging station 145a in an underground parking lot that does not receive sufficient wireless or telecommunication signals).

The electric vehicles 130a-c and the charging stations 145a-c, or associated communication devices, may include various computing components and/or modules configured and/or programmed to control, manage, diagnose, or otherwise interact with components of the electric vehicles 130a-c or charging stations 145a-c. For example, the computing components may include an on-board computing system that includes on-board diagnostics, such as components configured and/or programmed to detect and/or receive information from the electric vehicle's engine, battery pack, various sensors, dashboard controls, and so on. The components may detect, sense, and/or capture various types of information, such as outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on. For example, the components may detect, receive, and/or access motor controller information, such as information associated with the power, voltage, current, frequency, waveform, modulation, and/or regenerative power of the motor of the EV, as well as information from modules which control ancillary functions of the EV, such as information associated with operations of the lights, wipers, anti-lock brakes, seat warmers, music, climate controls, light sensors, smoke sensors, acceleration sensors, and other ancillary operations of an EV. Furthermore, the computing components may detect, receive, and/or access charging information, such as charging state information, voltage information power information, current information, and so on.

In some example embodiments, the computing environment 100 includes a grid alert system 150 that is configured to identify certain load or supply conditions on an electric grid 155, and shape, modify, or otherwise manage the load or supply conditions applies to the electric grid 155 due to various different charging events associated with vehicles or fleets of vehicles on the electric grid 155.

For example, the grid alert system 150 may receive signals (e.g., including various information or data) from the electric grid 155 and schedule or otherwise modify current or future charging events utilizing the grid based on the information, such as based on various market conditions or environmental conditions (e.g., pricing, cost, energy sources, and so on), based on load, supply, voltage, and/or other condition balancing or shaping, and so on. The grid alert system 150 may modify charging events and/or schedule charging events within various different time frames, such as a week ahead, a day ahead, near or real-time, and so on.

The grid alert system 150, therefore, performs various actions to change, modify, or otherwise alter the shape of a load on the electric grid 155 in real-time or within other time conditions.

In some embodiments, the grid alert system 150 utilizes information associated with the electric vehicle, associated with a driver of the electric vehicle, associated with the electric grid 155, and so on, to dynamically change or adjust (e.g., dynamically schedule) the shape of the load or other condition applied to the electric grid 155.

In some embodiments, the grid alert system 150 may utilize information from one or more current or future charging events (e.g., information from a vehicle, the driver, the charging station, and so on), to predict an expected load supply shape on a grid, and perform actions (e.g., schedule charging of vehicles) based on matching and/or optimizing the predicted load or supply shape with the expected market conditions associated with the electric grid 155.

FIG. 1 and the discussion herein provide a brief, general description of a suitable computing environment in which the grid alert system 150 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein. Moreover, any two or more of the machines, databases, or devices illustrated in FIG. 1 may be combined into a single machine, and the functions described herein for any single machine, database, or device may be subdivided among multiple machines, databases, or devices.

Examples of Generating Grid Alerts Using Charging Event Information

As described herein, the grid alert system 150 includes components, modules, and/or engines that perform various algorithms, processes, and/or methods to manage electric vehicle loads on an electric grid. For example, the grid alert system 150 may shape load or supply conditions applied to an electric grid 155 due to various different charging events associated with vehicles or fleets of vehicles on the electric grid 155.

For example, the grid alert system 150 may receive signals (e.g., including various information or data) from the electric grid 155 and schedule or otherwise modify current or future charging events utilizing based on the information, such as based on various market conditions or environmental conditions (e.g., pricing, cost, energy sources, and so on), based on load or other condition balancing, and so on. The grid alert system 150 may modify charging events and/or schedule charging events within various different time frames, such as a week ahead, a day ahead, near or real-time, and so on.

The grid alert system 150, therefore, performs various actions to change, modify, or otherwise alter the shape of a load on the electric grid 155 in real-time or within other time conditions.

In some embodiments, the grid alert system 150 utilizes information associated with the electric vehicle, associated with a driver of the electric vehicle (e.g., when the driver is away from the electric vehicle), associated with the electric grid 155, and so on, to dynamically change or adjust (e.g., dynamically schedule) the shape of the load or other condition applied to the electric grid 155.

Figure 2:
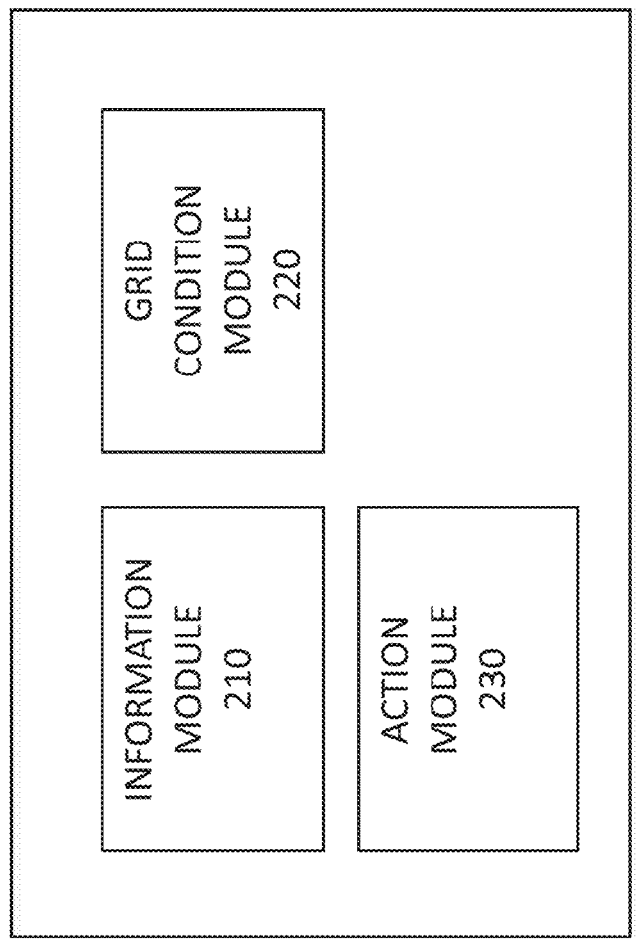
FIG. 2 is a block diagram illustrating the components of a grid alert system.

FIG. 2 is a block diagram illustrating the components of the grid alert system 150. In some example embodiments, the grid alert system 150 may include one or more modules and/or components to perform one or more operations of the grid alert system 150. The modules may be hardware, software, or a combination of hardware and software, and may be executed by one or more processors. For example, the grid alert system 150 may include an information module 210, a grid condition module 220, and an action module 230.

In some embodiments, the information module 210 is configured and/or programmed to access information identifying states of charging events for one or more electric vehicles at one or more charging stations, the one or more charging stations coupled to an electric grid and providing charge to the one or more electric vehicles.

In some embodiments, the grid condition module 220 is configured and/or programmed to determine that the information identifying the states of the charging events for the one or more electric vehicles at the one or more charging stations coupled to the electric grid indicates a condition (e.g., load or supply) of the electric grid that is above a predetermined threshold condition of the electric grid (e.g., at or above a peak condition outside of a threshold condition).

In some embodiments, the action module 230 is configured and/or programmed to perform an action (e.g., adjust or modify scheduling of charging events to shape the load or energy on the grid) in response to determining the condition of the electric grid is above the predetermined threshold condition of the electric grid. For example, the action module 230 may directly control operations of electric vehicles, such as charging operations of electric vehicles, vehicle component operations (e.g., turning on the air conditioner or heater of an electric vehicle), and so on.

Figure 3:
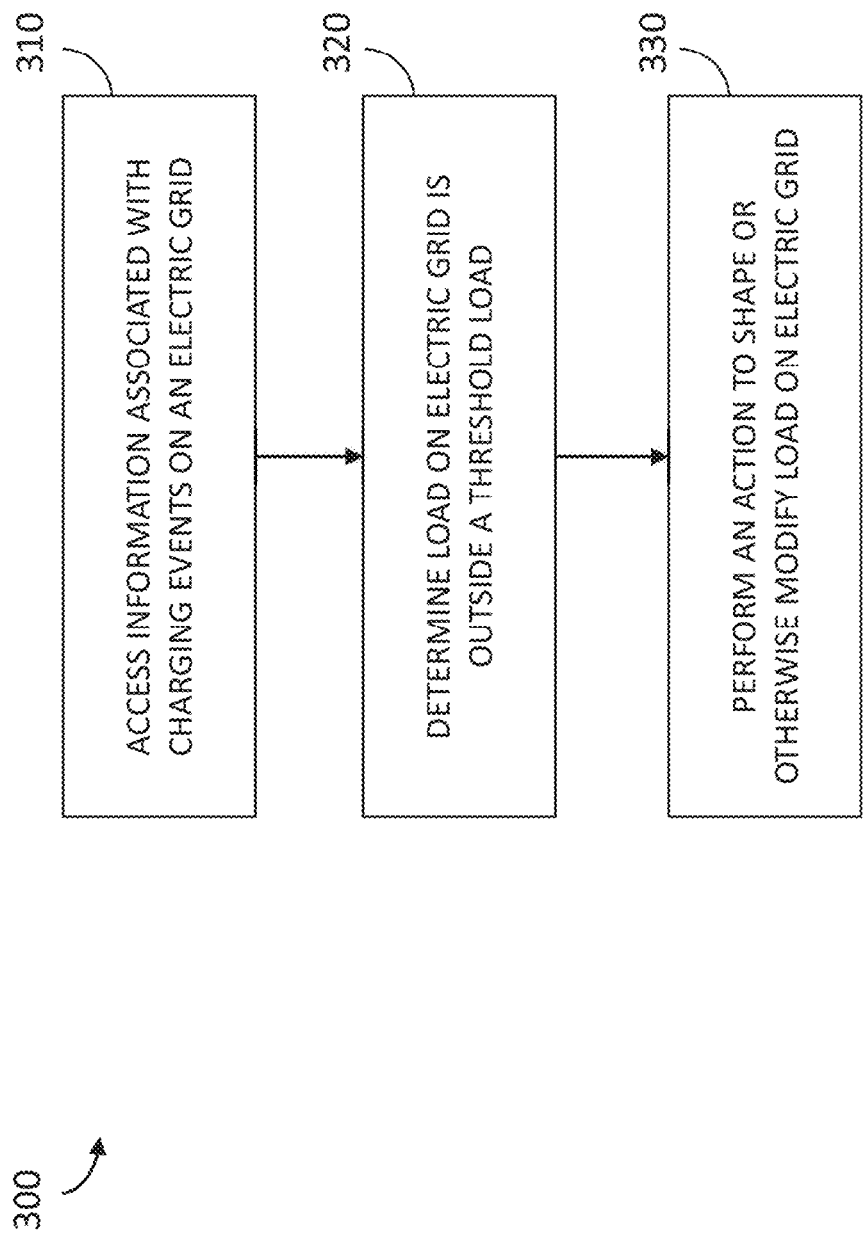
FIG. 3 is a flow diagram illustrating a method for managing an electric vehicle load for an electric grid.

FIG. 3 is a flow diagram illustrating a method 300 for generating a grid alert for an electric grid. The method 300 may be performed by the grid alert system 150 and, accordingly, is described herein merely by way of reference thereto. It will be appreciated that the method 300 may be performed on any suitable hardware.

In operation 310, the grid alert system 150 accesses information identifying states of charging events for one or more electric vehicles at one or more charging stations, the one or more charging stations coupled to an electric grid and providing charge to the one or more electric vehicles. For example, the information module 210 may access information collected by mobile applications that are associated with drivers of the one or more electric vehicles, such as information associated with the electric vehicle, information associated with the driver, and so on.

In some cases, the grid alert system 150 may receive from the grid information identifying other alert conditions, such as peak demand conditions, energy oversupply conditions, overvoltage conditions, under-voltage conditions, and so on. The alert conditions may be globally applied to an entire grid, or localized to one or more geographical locations supplied by the grid.

In operation 320, the grid alert system 150 determines that the information identifying the states of the charging events for the one or more electric vehicles at the one or more charging stations coupled to the electric grid indicates a condition of the electric grid that is outside of a predetermined threshold condition of the electric grid. For example, the grid condition module 220 may determine a cumulative load applied to the electric grid due to the charging events for the one or more electric vehicles at the one or more charging stations is above a predetermined threshold load applied by charging electric vehicles on the electric grid and/or is below a minimum threshold load applied by charging electric vehicles on the electric grid.

In operation 330, the grid alert system 150 performs an action in response to determining the condition of the electric grid is outside of the predetermined threshold condition of the electric grid. For example, the action module 230 may automatically pause a group of the one or more charging events, determine that a cumulative load applied to the electric grid after pausing the group of charging events is below the predetermined threshold load applied by charging electric vehicles on the electric grid, and resume the charging events of the paused group of charging events.

As another example, the action module 230 may identify a group of electric vehicles associated with low priority charging events (e.g., events associated with charging vehicles not in use until the following day), automatically pausing the low priority charging events, determine that a cumulative load applied to the electric grid after pausing the low priority events is below the predetermined threshold load applied by charging electric vehicles on the electric grid, and resume the low priority charging events for the identified group of electric vehicles. In some cases, the action module 230 may hold certain low priority vehicles in reserve, in anticipation of servicing future or predicted supply or load conditions at the grid. As described herein, in some embodiments, the grid alert system 150 provides a dynamic load (e.g., a load based on many, e.g., 100 or 300 or more, controllable electric vehicles, and their batteries) to an electric grid, in order to monitor, predict, shape, shift, or otherwise impact a load applied to an electric grid, such as those described herein.

Such prediction of the load may be in real-time and localized to points where electric vehicles connect to the grid and receive charge from the grid. The grid alert system 150, by having control of various different electric vehicles at many different grid connection points, may determine and/or predict various deviations to a load on the grid, and may shape/shift the load on the grid by controlling the charging of the vehicles (e.g., charging some or all of the vehicles, slowing down charging of certain vehicles, and so on) under control of the system.

For example, the grid alert system 150 may manage a load applied to an electric grid by receiving a grid alert from an electric grid that indicates the electric grid is in a demand condition outside of a threshold demand condition, and directly controlling charging operations of a fleet of electric vehicles connected to the electric grid to adjust the demand condition of the electric grid.

The system 150 may:
pause charging events for one or more of the electric vehicles to lower the demand condition of the electric grid,
commence charging events for one or more of the electric vehicles to lower an energy supply applied to the electric grid,
pause charging events for one or more of the electric vehicles connected to the electric grid at a specific location of the electric grid to lower a voltage applied to the electric grid at the specific location,
pause charging events for one or more of the electric vehicles at a first location of the electric grid, and commence charging events for one or more of the electric vehicles at a second location of the electric grid, and so on.

Therefore, the grid alert system 150 may control charging of a group or fleet of electric vehicles in order to shape or shift a load applied to an electric grid, which can realize lower costs associated with the charging, among other benefits.

Examples of Recreating Charging Events

As described herein, the grid alert system 160 may recreate charging events using various types of data, including vehicle data, charging station data, and so on, in order to provide additional inputs into determining a current or predicted load shape on the electric grid 155. For example, when the grid alert system 150 obtains only a partial amount of data from the grid 155, the grid alert system 150 may utilize connected vehicles as electric meters, and apply parameters associated with real-time or previous charging of vehicles on the grid 155 as grid data.

As an example, the system 150 may identify a group of electric vehicles is charging at one location of the electric grid (e.g., all vehicles are on a single neighborhood block), and determine that the transformer supplying power to the block will be overloaded. The system 150 may inform the grid of the predicted overload condition and/or may perform actions to mitigate the overload condition as described herein.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being. redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system

What is claimed is:

1. A non-transitory computer-readable medium whose contents, when executed by a computing system, cause the computing system to perform a method of managing a load applied to an electric grid, the method comprising:
   receiving a grid alert from an electric grid that indicates the electric grid is in a demand condition outside of a threshold demand condition; and
   directly controlling charging operations of a fleet of electric vehicles connected to the electric grid to adjust the demand condition of the electric grid.

2. The computer-readable medium of claim 1, wherein directly controlling charging operations of a fleet of electric vehicles connected to the electric grid to adjust the demand condition of the electric grid includes:
   pausing charging events for one or more of the electric vehicles to lower the demand condition of the electric grid.

3. The computer-readable medium of claim 1, wherein directly controlling charging operations of a fleet of electric vehicles connected to the electric grid to adjust the demand condition of the electric grid includes:
   commencing charging events for one or more of the electric vehicles to lower an energy supply applied to the electric grid.

4. The computer-readable medium of claim 1, wherein directly controlling charging operations of a fleet of electric vehicles connected to the electric grid to adjust the demand condition of the electric grid includes:
   pausing charging events for one or more of the electric vehicles connected to the electric grid at a specific location of the electric grid to lower a voltage applied to the electric grid at the specific location.

5. The computer-readable medium of claim 1, wherein directly controlling charging operations of a fleet of electric vehicles connected to the electric grid to manage the demand condition of the electric grid includes shifting an overall load applied to the electric grid by:
   pausing charging events for one or more of the electric vehicles at a first location of the electric grid; and
   commencing charging events for one or more of the electric vehicles at a second location of the electric grid.

6. The computer-readable medium of claim 1, wherein directly controlling charging operations of a fleet of electric vehicles connected to the electric grid to adjust the demand condition of the electric grid includes controlling the charging operations of the fleet of electric vehicles to shape a load condition of the electric grid.

7. The computer-readable medium of claim 1, wherein directly controlling charging operations of a fleet of electric vehicles connected to the electric grid to adjust the demand condition of the electric grid includes controlling the charging operations of the fleet of electric vehicles to shape a load condition of the electric grid.

8. The computer-readable medium of claim 1, wherein directly controlling charging operations of a fleet of electric vehicles connected to the electric grid to adjust the demand condition of the electric grid includes directly controlling the charging operations of the fleet of electric vehicles by directly controlling charging stations that are connected to the electric grid and charging the fleet of the electric vehicles.

9. A method of managing a load applied to an electric grid, the method comprising:
   receiving a grid alert from an electric grid that indicates the electric grid is in a demand condition outside of a threshold demand condition; and
   directly controlling charging operations of a fleet of electric vehicles connected to the electric grid to adjust the demand condition of the electric grid.

10. The method of claim 9, wherein directly controlling charging operations of a fleet of electric vehicles connected to the electric grid to adjust the demand condition of the electric grid includes:
   pausing charging events for one or more of the electric vehicles to lower the demand condition of the electric grid.

11. The method of claim 9, wherein directly controlling charging operations of a fleet of electric vehicles connected to the electric grid to adjust the demand condition of the electric grid includes:
   commencing charging events for one or more of the electric vehicles to lower an energy supply applied to the electric grid.

12. The method of claim 9, wherein directly controlling charging operations of a fleet of electric vehicles connected to the electric grid to adjust the demand condition of the electric grid includes:
   pausing charging events for one or more of the electric vehicles connected to the electric grid at a specific location of the electric grid to lower a voltage applied to the electric grid at the specific location.

13. The method of claim 9, wherein directly controlling charging operations of a fleet of electric vehicles connected to the electric grid to manage the demand condition of the electric grid includes shifting an overall load applied to the electric grid by:
   pausing charging events for one or more of the electric vehicles at a first location of the electric grid; and
   commencing charging events for one or more of the electric vehicles at a second location of the electric grid.

14. The method of claim 9, wherein directly controlling charging operations of a fleet of electric vehicles connected to the electric grid to adjust the demand condition of the electric grid includes controlling the charging operations of the fleet of electric vehicles to shape a load condition of the electric grid.

15. The method of claim 9, wherein directly controlling charging operations of a fleet of electric vehicles connected to the electric grid to adjust the demand condition of the electric grid includes directly controlling the charging operations of the fleet of electric vehicles by directly controlling charging stations that are connected to the electric grid and charging the fleet of the electric vehicles.

16. A grid alert system, comprising:
   an information module that receives information from multiple electric vehicles indicating future charging events to be performed for the multiple electric vehicles using energy provided by an electric grid;
   a grid condition module that determines a predicted load shape to be applied to the electric grid in response to the performance of the future charging events; and
   an action module that performs an action in response to the predicted load shape to be applied to the electric grid.

17. The grid alert system of claim 16, wherein the action module performs actions to directly control charging operations of the multiple electric vehicles when the predicted load shape applied to the electric grid is outside of a threshold load shape for the electric grid.

18. The grid alert system of claim 16, wherein the action module controls charging operations of the multiple electric vehicles via charging stations connected to the electric grid and actively charging the multiple electric vehicles when the predicted load shape applied to the electric grid is outside of a threshold load shape for the electric grid.

19. The grid alert system of claim 16, wherein the information module receives information from the multiple electric vehicles that includes information identifying states of charge for batteries of the electric vehicles.

* * * * *